US010786333B2

(12) United States Patent
Boehm (10) Patent No.: US 10,786,333 B2
(45) Date of Patent: *Sep. 29, 2020

(54) SYSTEM COMPRISING A STATIC MIXER AND A DISPENSING DEVICE FOR DENTAL MATERIALS (71) Applicant: 3M INNOVATIVE PROPERTIES COMPANY, St. Paul, MN (US)

(72) Inventor: Andreas J. Boehm, Reichling (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/737,009

(22) PCT Filed: Jun. 14, 2016

(86) PCT No.: PCT/US2016/037342
§ 371 (c)(1),
(2) Date: Dec. 15, 2017

(87) PCT Pub. No.: WO2016/205181
PCT Pub. Date: Dec. 22, 2016

(65) Prior Publication Data
US 2018/0153645 A1 Jun. 7, 2018

(30) Foreign Application Priority Data
Jun. 17, 2015 (EP) .................................... 15172461

(51) Int. Cl.
*A61C 5/68* (2017.01)
*A61C 9/00* (2006.01)
(Continued)

(52) U.S. Cl.
CPC .................. *A61C 5/68* (2017.02); *A61C 5/64* (2017.02); *A61C 9/0026* (2013.01);
(Continued)

(58) Field of Classification Search
CPC .... A61C 5/60; A61C 5/62; A61C 5/64; A61C 5/68; B01F 5/06; B01F 5/0614; B01F 5/0615; B01F 5/064
See application file for complete search history.

(56) References Cited

U.S. PATENT DOCUMENTS 4,753,536 A * 6/1988 Spehar .............. B05C 17/00506
222/137
4,767,026 A 8/1988 Keller
(Continued)

FOREIGN PATENT DOCUMENTS

| EP | 2230025 | 9/2010 |
| WO | WO 2005-016170 | 2/2005 |
| WO | WO 2006-005206 | 1/2006 |

OTHER PUBLICATIONS

International Search report for PCT International Application No. PCT/US2016/037342 dated Aug. 26, 2016, 5 pages.

*Primary Examiner* — Ralph A Lewis
(74) *Attorney, Agent, or Firm* — 3M Innovative Properties Company (57) ABSTRACT A system which has a static mixer and which contains a dental material. The static mixer has a mixing barrel that extends along a longitudinal axis and, accommodated therein, a cascade of mixing elements. Mixing elements have an outer diameter D of between 1.5 mm and 1.6 mm. The barrel has an inner diameter corresponding to the outer diameter of the mixing elements. The system helps minimizing any residual dental material in the mixer and minimizing forces for extruding the dental material through the mixer.

15 Claims, 4 Drawing Sheets (51) Int. Cl.
*A61C 5/64* (2017.01)
*B01F 5/06* (2006.01)

(52) U.S. Cl.
CPC .... *B01F 5/0615* (2013.01); *B01F 2005/0629* (2013.01); *B01F 2005/0637* (2013.01); *B01F 2215/0027* (2013.01); *B01F 2215/0039* (2013.01)

(56) References Cited

U.S. PATENT DOCUMENTS

| | | | | |
|---|---|---|---|---|
| 4,995,540 | A * | 2/1991 | Colin | A61C 9/0026 222/132 |
| 5,609,271 | A * | 3/1997 | Keller | B05C 17/00506 222/145.6 |
| 6,065,645 | A * | 5/2000 | Sawhney | B01F 5/0615 222/137 |
| 6,398,761 | B1 | 6/2002 | Bills | |
| 6,769,574 | B1 * | 8/2004 | Keller | B05C 17/00509 222/137 |
| 8,236,871 | B2 | 8/2012 | Hecht | |
| 8,328,553 | B2 * | 12/2012 | Broyles | A61C 9/0026 433/80 |
| 2008/0089173 | A1 * | 4/2008 | Lu | B01F 5/0615 366/339 |

* cited by examiner

SYSTEM COMPRISING A STATIC MIXER AND A DISPENSING DEVICE FOR DENTAL MATERIALS

FIELD OF THE INVENTION

The invention relates to system comprising a static mixer which has a mixing barrel and, accommodated therein, a cascade of mixing elements. In particular the invention relates to such a system in which the mixing elements have an outer diameter D of between 1.5 mm and 1.6 mm.

BACKGROUND ART

Dental materials are often prepared from two or more components that are mixed together just before use. Often the individual components are obtained as portions from larger packages, for example from tubes, bags or cartridges. There are packages on the market that allow manual or automatic dispensing of two or more components at desired amounts and at an appropriate ratio for mixing. Furthermore there are packages that allow dispensation of portions of readily mixed materials from individually stored components.

Often double-barrel syringes are used for storing and mixing two-component dental materials. Such double-barrel syringes typically have two side by side barrels from which the components of the dental material can be extruded by pushing pistons into the barrels. There are syringes to which a static mixer can be attached for mixing the two components as there are extruded from the syringe.

For example WO 2006/005206 A1 discloses a system for dispensing two components, which comprises a syringe or cartridge, a closing cap and a mixer. The aim of the invention is to provide a system of the aforementioned kind wherein the closing cap is detachably fastened on the syringe or cartridge and the mixer is non-detachably fastened on the cartridge. For this purpose, the fastening means are configured accordingly.

Although existing syringes provide certain advantages there is still a need to provide a system which is easy to use and which provides for an appropriate mixing quality of dental materials.

SUMMARY OF THE INVENTION

The invention relates to a system comprising a static mixer and a dental material. The static mixer comprises a mixing barrel and a cascade of helical mixing elements accommodated therein. The mixing barrel extends along a longitudinal axis and the mixing elements have an outer diameter D of between 1.5 mm and 1.6 mm. Further, the barrel has an inner diameter which corresponds to or essentially corresponds to the outer diameter of the mixing elements.

The invention is advantageous in that it provides a static mixer which is surprisingly short in comparison to a length that would be theoretically expected for such a mixer. Further the invention is advantageous in that it helps minimizing the residual dental material within the static mixer. Further, the invention provides a system which can be operated at relatively low extrusion forces. Thus, the invention also helps minimizing costs in the preparation of dental materials in a dental practice. The invention is especially useful for mixing hardenable compositions.

In a preferred embodiment the dental material is provided in the form of two components A and B which in combination form the hardenable composition. Preferably, the so formed hardenable composition corresponds to the dental material. Hardenable compositions which are obtainable by mixing include, in particular, dental materials including dental composite cements, dental glass ionomer cements, flowable dental composite materials, filled dental adhesives etc. A hardenable composition obtained from mixing typically comprises a hardenable matrix, a filler, and a catalyst or initiator system.

Preferably, the two components are combined with each other by merging in the static mixer. Each of the components preferably has a viscosity within the range of $|\eta^*|/2$ Pa s and $|\eta^*|/50$ Pa s, in more particular of between $|\eta^*|/5$ Pa s and $|\eta^*|/50$ Pa s. Further, the viscosities of the two components may be similar, for example differ only by less than $|\eta^*|/20$ Pa s, preferably by less than $|\eta^*|/5$ Pa s from each other. The static mixer of the invention can be advantageously used with components having a viscosity in the specified range. If the viscosity of the components to be mixed is within the range as specified herein, a good mixing quality can be achieved. Further, the components can be urged through the static mixer at relatively low extrusion forces. Such low extrusion forces can be typically generated by a manually operated system as described herein further below.

Examples of compositions which can be mixed with the static mixer and system specified herein are disclosed in U.S. Pat. No. 8,236,871 B2.

The viscosity can be measured using a Physica MCR 301 Rheometer (Anton Paar, Graz, Austria) with a plate/plate geometry of 15 mm diameter and a gap width of 0.2 mm in oscillation mode at a temperature of 23° C. The viscosity is determined as complex viscosity $|\eta^*|$ at 3 Hz frequency and 2000% deformation.

In one embodiment the dental material is a free-radically polymerizable composition comprising:

a) a compound having the general formula (I)

wherein R1, R2, and R3 are independently selected from hydrogen, alkyl, substituted alkyl, alkenyl, cycloalkyl, substituted cycloalkyl, arylalkyl, aryl or substituted aryl;

X is oxygen or sulfur;

Y is a metal cation or organic cation; and b) an ethylenically unsaturated compound without acid functionality.

In one embodiment, the component A comprises one or more hardenable component(s) and a filler and the component B comprises filler, a catalyst (or initiator) suitable for hardening the hardenable component(s) contained in component A, optionally diluents and optionally hardenable component(s) which can be the same as or different than the hardenable component(s) contained in the component A. Further, components like solvents or additives, for example, can be added to one or both components.

The component A of the dental material may for example comprise:

| 15.0% by weight | Propoxylated Bisphenol A dimethacrylate |
| 15.0% by weight | TEGDMA |
| 3.0% by weight | Ca-BzPB |
| 67.0% by weight | FAS glass (acid-reactive) |

And the component B of the dental material may for example comprise:

| 29.9% by weight | Glycerol-1,3-dimethacrylate phosphate |
| 0.1% by weight | Cu(II)-acetate |
| 70.0% by weight | Strontium aluminum fluorosilicate glass (nonreactive, 3% silane) |

Further details about the exemplary composition are disclosed in U.S. Pat. No. 8,236,871 B2.

In one embodiment the helix of the mixing elements extends over a length L and a winding angle of essentially 180 degrees, and wherein the aspect ratio of L/D is between about 0.6 to 1.2, preferably about 0.78.

In a further embodiment the cascade of mixing elements comprises first elements having a left handed winding and second elements having a right handed winding. The first and second elements are preferably alternately arranged in sequence along the longitudinal axis. Thus, the homogeneity of any mixture prepared by the so arranged mixing elements can be maximized.

In a preferred embodiment the number of mixing elements is between 6 and 16 and preferably 9. It was found that a static mixer having mixing elements with a diameter D according to the invention provides for an unexpected improved mixing effect which provides for a more homogeneous mixture of the dental material. This means that based on a required theoretic number of mixing elements, actually a lower number of mixing elements is necessary with the static mixer of the invention. Accordingly, the forces required to urge the dental material through the static mixer can be minimized. This is because fewer mixing elements (each causing shearing of the dental material and flow resistance) are necessary.

In a preferred embodiment the mixing elements are connected to each other to form a mixing unit. The mixing elements are preferably arranged in a spaced relationship with each other connected by a connecting pin which is smaller in diameter than the outer diameter D. Further, each mixing element is preferably formed by twisted blade. The outer dimensions or the outer diameter of the pin is preferably equal or smaller that the thickness of the blade.

In one embodiment the mixing unit has a front end and a rear end, and a first and a second inlet tube at the rear end. The mixing unit may further have a collector plate adjacent the rear end which extends in at least two directions laterally from the longitudinal axis. The mixing unit preferably further has a substantially cross-shaped protrusion protruding from the collector plate and connecting with the rear most mixing element of the cascade of mixing elements. The cross-shape of the protrusion provides for premixing of the components flowing toward the mixing elements, as further described in detail below. The first and second inlet tube protrude rearwards (in a direction from the front end toward the rear end of the mixing unit) from the collector plate and form extensions of a first and second through-channel, respectively, through the collector plate.

In one embodiment the system has a mixer housing which comprises the mixing barrel. The mixer housing preferably forms at a front end a dispensing opening and at a rear end a coupling for attachment of the mixer housing with a cartridge. The mixing unit may be retained or retainable at the mixer housing against rotation about the longitudinal axis. The mixing unit may have at least one retention structure and the mixing housing may have at least one retention receptacle. The retention against rotation between the mixing unit and the mixer housing may thus be formed by a mating of the retention structure and the retention receptacle. Therefore, a rotation of the mixing housing consequently causes a rotation of both, the mixing housing together with the mixing unit.

In one embodiment the system has a first and a second retention structure. Each of the first and second retention structure may be formed by a non-circumferential wall protruding forwards from the collector plate partially around an opening of the first and second through-channel, respectively. An inner surface of the first and second retention structure may form a continuation of an inner surface of the first and second through-channel, respectively. Further a portion of each of the first and second retention structure overhangs the first and second through-channel, respectively. In other words the first and second retention structure may be formed by cup-shaped protrusions which protrude with the bottom sides ahead from the collector wall and which each have a lateral opening.

In a further embodiment the mixer housing and the mixing unit in combination form independent first and second inlet channels. Each of the first and second inlet channels preferably extend between the first and second inlet tube, respectively, and the substantially cross-shaped protrusion. Accordingly, an assembly of the mixer housing and the mixing unit form inlet channels for guiding the individual components of the dental material from the first and second inlet tubes toward the mixing elements.

In a further aspect the invention relates a dispensing device for dental materials. The device comprises the system of the invention. The device has a cartridge having two chambers for holding the dental material in the form of two separate components, for example the components A and B as disclosed herein or a composition as disclosed in U.S. Pat. No. 8,236,871 B2. Further, the device has preferably a plunger for displacing the dental material toward the mixing elements.

In one embodiment the mixer housing in combination with the mixing unit forms a rotation valve with the cartridge for selectively establishing or blocking a fluid communication between the chambers and the mixing barrel by rotation of the mixer housing and the cartridge relative to each other.

DETAILED DESCRIPTION OF THE INVENTION

Figure 1:
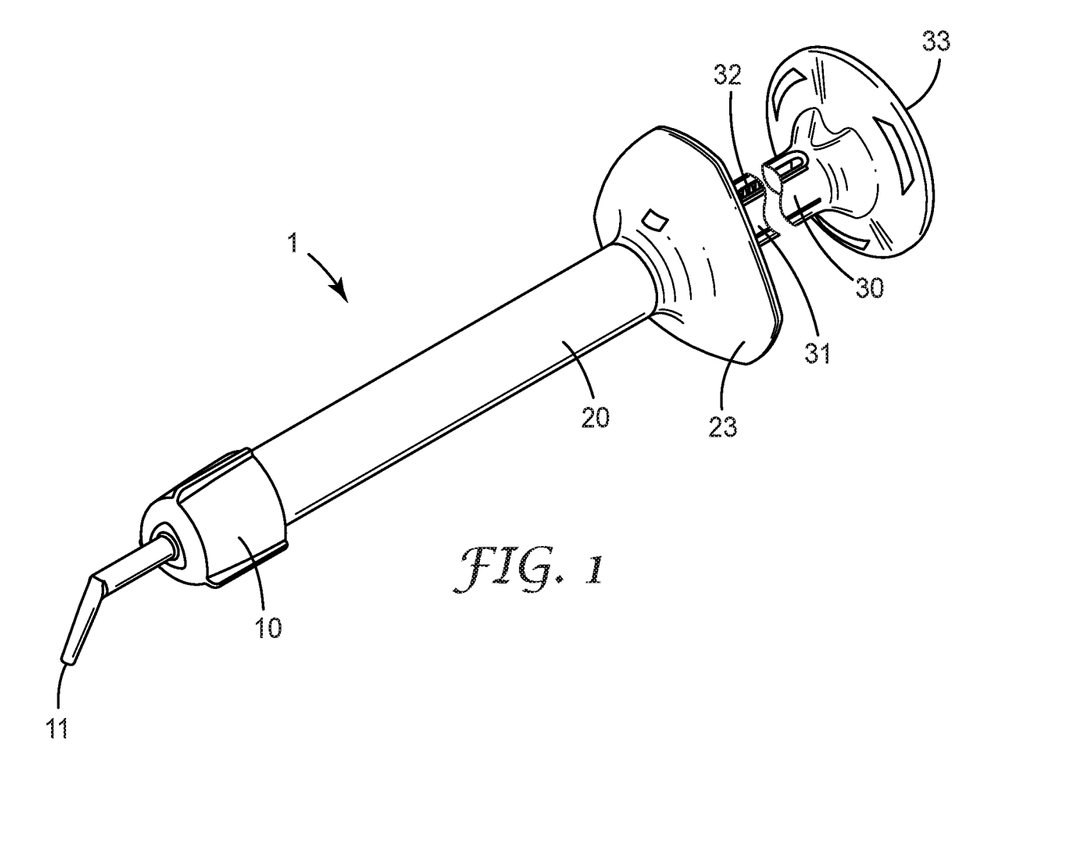
FIG. 1 is a perspective view of a system according to an embodiment of the invention.

FIG. 1 shows a device 1 for dispensing dental material. The device 1 has a dispensing nozzle 10, a cartridge 20 and a plunger 30. The cartridge 20 forms two chambers (not visible in this view) for separately storing the dental material in the form of two components. The plunger 30 has two plunger rods 31, 32 for displacing the two components toward the dispensing nozzle 10. The dispensing nozzle 10 forms a dispensing opening 11 at a front end of the dispensing nozzle 11. The device 1 is operable by hand. Therefore the device 1 has a finger plate 23 arranged at the cartridge 20 and a pressure plate 33 forming a rear end of the plunger 30. The finger plate 23 in the example is arranged at a rear end of the cartridge 20.

The dispensing nozzle 10 is received on a front end of the cartridge 20. The dispensing nozzle 10 and the cartridge 20 are rotatable relative to each other. In particular, the dispensing nozzle 10 and the cartridge 20 in combination form a rotary valve for selectively opening or closing the chambers of the cartridge. Accordingly, the dispensing nozzle 10 and the cartridge 20 can be rotated relative to each other between a closed position, in which the chambers are closed, and an open position, in which the chambers are in fluid communication with the dispensing opening 11.

In the open position, moving the plunger 30 forward (in a direction toward the dispensing nozzle 10) causes the dental material to flow through the dispensing nozzle 10. The dispensing nozzle 10 has a mixing unit (not visible in this view) which causes the dental material to mix as it flows through the dispensing nozzle 10. Thus, the dental material is dispensed from the dispensing opening 11 in a mixed condition.

Figure 2:
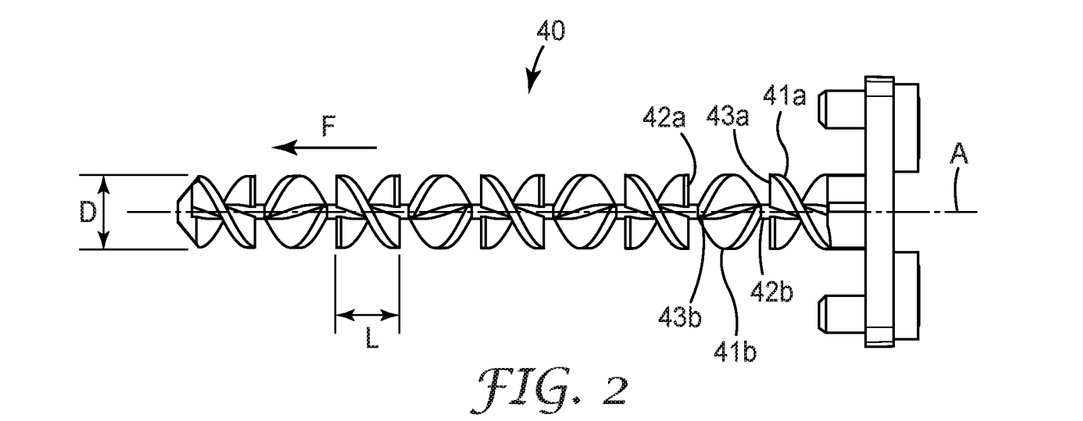
FIG. 2 is a side view of a mixing unit according to an embodiment of the invention.

FIG. 2 shows the mixing unit 40 which may be arranged within the dispensing nozzle illustrated in FIG. 1. The mixing unit 40 has a cascade of mixing elements 41a/41b. Each mixing element 41a/41b is based on a helical shape or a helicoid. The structure of such a helical mixing element can be basically imagined as a planar sheet of material which, held at opposite ends, is twisted or wound by 180 degrees, although other methods (for example injection molding) are typically used to manufacture such a structure. The overall outer shape of such a mixing element 41a/41b is based on a cylindrical helix. Therefore each mixing element has an outer diameter D. Each mixing element has an entry edge 42a/42b for the material and an exit edge 43a/43b. With respect to a flow F of the dental material through the mixing unit the material enters each mixing element 41a/41b at the entry edge 42a/42b and exits each mixing element 41a/41b at the exit edge 43a/43b. The mixing unit 40 has a plurality of mixing elements 41a/41b arranged in sequence. The entry and exit edges 42a/42b, 43a/43b of two adjacent mixing elements 41a/41b are angularly offset relative to each other. Therefore, the flow of the two components of the dental material is divided and partial divisional streams thereof merged multiple times as the dental material flows through the mixing unit 40. Thus the dental material is mixed. The angle of the offset between the entry and exit edges 42a/42b, 43a/43b is measured in a plane perpendicular to a longitudinal axis A of the mixing unit and on a point on that longitudinal axis A. The angle of the offset between the entry and exit edges 42a/42b, 43a/43b in the example is 90 degrees. In other words, the entry and exit edges 42a/42b, 43a/43b of adjacent mixing elements 41a/41b are arranged crosswise relative to each other.

As shown, the mixing unit 40 has right handed mixing elements 41a and left handed mixing elements 41b which are consecutively arranged in an alternate order along the longitudinal axis A. The right and left handed mixing elements 41, 41b differ in the winding direction of the helix on which mixing element 41a/41b is based.

According to the invention the mixing elements 41a/41b have an outer diameter D of between 1.5 mm and 1.6 mm. Further, each mixing element has a length L of between 0.6 mm and 1.2 mm, preferably 0.78 mm. The diameter D as well as the Length L is preferably the same for all mixing elements 41a/41b of the mixing unit 40.

It has been found that the specific range of the diameter D of the mixing elements 41a/41b unexpectedly provides for an improved mixing result relative to the result that would be theoretically achieved, as outlined in the following.

The mixing quality typically is a result of the number of mixing elements a material flows through. Typically a two component material enters a mixer in two separate streams where they merge for the first time into a common stream made up of two layers, each layer being formed of one of the components. The first mixing element causes such two-layer stream to be divided into two streams, each having two layers. The next mixing element again causes a doubling of the layers into four layers, and so on. Accordingly the number of layers in the streams of material exponentially increases while the thickness of the individual layers progressively decreases. In practice, a limited number of consecutive mixing elements provides for the layers to reduce in thickness far enough so that the material is homogeneously mixed to a sufficient extent. There are mixers in which a pre-mixing chamber or other pre-mixing means provides for the material to enter the first mixing element already as a two layer material. However, once the material has entered the mixing element the remaining mixing process is the same as described before.

Figure 3:
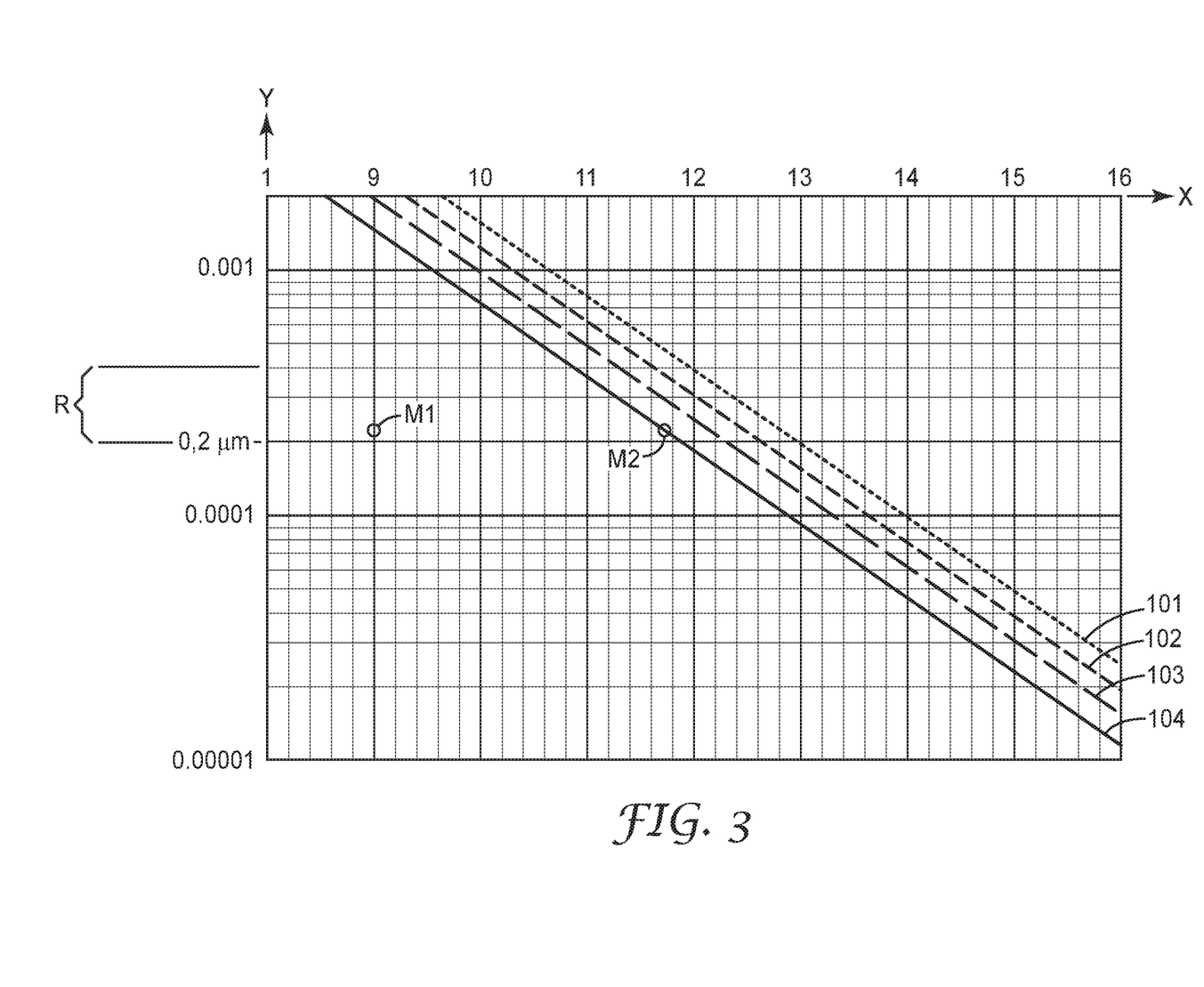
FIG. 3 is a diagram showing the mixing quality of different types of mixers depending of the number of mixing elements of the mixer.

FIG. 3 shows a diagram of the layer thickness of two component materials after mixing in mixers having different diameters and a different number of mixing elements. The term "diameter" as referred to in this example means the diameter of the mixing elements and the inner diameter of a mixing barrel in which the mixing elements are arranged. The number of mixing elements are defined on the X-axis, whereas the layer thickness in Millimeters is defined on the logarithmic scaled Y-axis. The mixing quality is indicated by lines 101, 102, 103 and 104. Line 101 refers to the mixing quality provided by a mixer which mixing elements have a diameter of 3.1 mm, line 102 refers to the mixing quality provided by a mixer which mixing elements have a diameter of 2.4 mm, line 103 refers to the mixing quality provided by a mixer which mixing elements have a diameter of 2 mm and line 101 refers to the mixing quality provided by a mixer of the invention which mixing elements have a diameter of 1.5 mm. As expected, a mixer having a greater diameter (in particular a mixer in which the mixing elements have a greater diameter) results in a greater layer thickness of the material. Further, the more mixing elements are used, the thinner are the layers. This means, that for mixers having a larger diameter typically more mixing elements are required to achieve the same mixing quality as a mixer having a smaller diameter. In the diagram a reference mixing quality is defined within range R. It is noted that the "reference mixing quality" as defined in the diagram does not necessarily correspond to a required minimum or maximum mixing quality for the material to appropriately harden and/or to provide a mixture at any required product quality. Rather, the "reference mixing quality" refers to a mixture from differently colored components, which exhibits an optically generally homogeneous combination color. Such a high mixing quality may not be necessary or desired in practice and was set as a basis only in the examples of the present specification. As seen from the diagram for achieving the reference mixing quality, mixers having a diameter of between 2 mm and 3.1 mm essentially all require at least 11 or 12 mixing elements. To verify the mixing quality actually achieved by mixers having different diameters the following examples were conducted:

EXAMPLES

A syringe which is available from the company Sulzer Ltd, Switzerland, under the designation MIXPAC™ Double Syringe having a capacity of 5 ml was filled with 3M™ ESPE™ dental cement RelyX™ Unicem, Lot No 469868. 3M™ ESPE™ RelyX™ Unicem (further referred to as the "sample material") is a two-component material having a catalyst paste and a base paste, portions of which were filled in the MIXPAC™ Double Syringe such that the catalyst paste and the base paste were each accommodated in one of the two cylinders of the syringe.

The catalyst paste had an essentially white color, whereas the base paste was previously dyed with a blue color. The different colors of the two components were provided to allow for visibly identifying any individual portions of the pastes still present in a mixture of those.

Example 1

Different types of mixing tips have been used with the syringe to prepare mixtures of the sample material as shown in Table 1. Overall 6 different types of mixing tips have been used: a set of 3 different mixing tips having a mixing element diameter of 3.1 mm and further set of 3 different mixing tips having a mixing element diameter of 2.4 mm. The diameter of the mixing elements corresponded to the inner diameter of the mixing barrel. Of each set of mixing tips 3.1 mm and 2.4 mm different types having 8, 12 or 16 mixing elements were used, respectively.

TABLE 1

| Diameter of mixing elements | Diameter = 3.1 mm | | | Diameter = 2.4 mm | | |
|---|---|---|---|---|---|---|
| Number of mixing elements | 8 | 12 | 16 | 8 | 12 | 16 |

Each mixer type was assembled on the syringe prepared as described. The sample material was extruded through the static mixer and thus dispensed as a mixed sample. A first amount of paste (approximately 0.1 g) was discarded. Then a strand of about 50 mm length was extruded on a microscope slide as base slide. A second microscope slide was pressed on the strand as cover slide, so that a sandwich of the two microscope slides with the mixed sample squeezed to a flat film between was formed.

The microscope slides used were of a type ECN 631-1553 available from the company VWR International GmbH, Germany. The base slide had the dimensions 25×75×1 mm and the cover slide had the dimension 18×18×0.15 mm.

Three slides of the type 18×18×0.15 were placed as a spacer between the base slide and the cover slide with no contact to the strand. Thus, is was provided that the strand was squeezed to a uniform film at a pre-determined thickness of about 0.15 mm. In the so formed film the homogeneity of the mixed sample material was visibly assessed based on the different colors of the components. While a general homogeneous mixture exhibited a generally uniform combination color, an inhomogeneity in mixing was determined from visible patterns formed by the two distinct colors.

Comparative Example

Example 1 was repeated with 6 different static mixer types according to the invention, each having mixing elements having a diameter of 1.5 mm, but with 4, 5, 6, 7, 8 or 9 mixing elements, respectively. To install the static mixers a two-component syringe was used essentially as shown in FIG. 1. Identically as in Example 1 in this syringe the two components were only mixed in the static mixer and stored separate from each other in the syringe. Further, the mixing tips used in Example 1 and the static mixers—aside from the number of mixing elements—only differentiated in diameter. Particularly, the winding angle of 180 degrees of each mixing element, the alternate arrangement of left handed and right handed mixing elements and the aspect ratio L/D were generally the same in the Example 1 and the Comparative Example.

Results

In Example 1 a homogeneous mixture was achieved by using at least 12 mixing elements having a diameter D of 3.1 mm. Only 8 mixing elements of the same diameter failed to provide a homogeneous mixture according to the definitions herein. The same result was achieved in Example 1 using mixing elements of 2.4 mm diameter. This is in accordance with lines 101, 102 of the diagram.

According to the diagram a mixer having a diameter D of 1.5 mm would be expected to require at least 11 mixing elements to achieve the reference mixing quality R. However, in fact the desired mixing quality was already achieved by a mixer having a diameter D of 1.5 mm and only 9 mixing elements. According to the diagram a mixture provided by only 9 mixing elements would be clearly out of the range R.

It was further found that a reduction of the diameter causes a significant increase of the force needed for urging the dental material through the mixer. Therefore, it is believed that in a balance between acceptable forces for urging the material though the mixer and a desirably small diameter there is an additional unexpected mixing effect.

Figure 4:
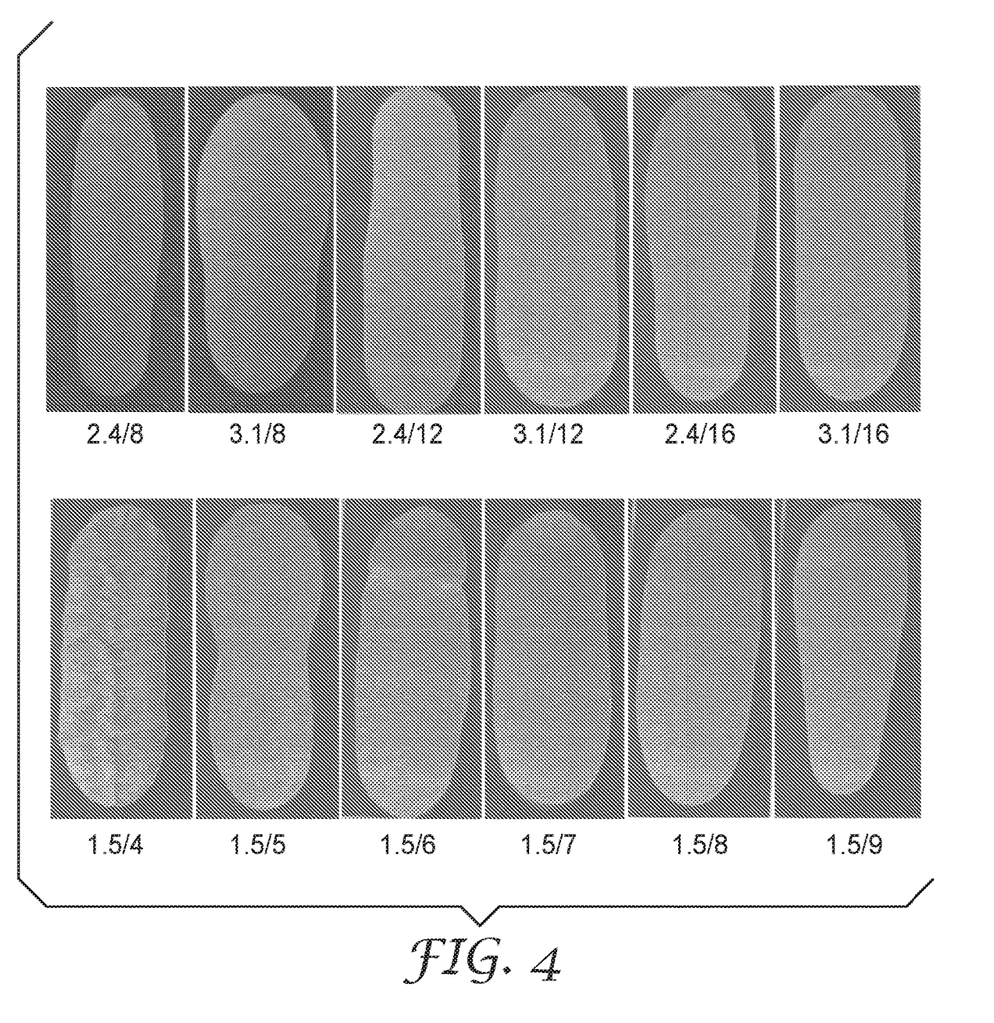
FIG. 4 is a summary of photos of mixed material samples.

FIG. 4 shows photos of the mixed sample materials placed between the glass sides as described herein. The photos are designated by the diameter of the mixing elements and the number of mixing elements used for mixing. For example the designation 2.4/8 means that a mixer having 8 mixing elements with a diameter of 2.4 mm was used. The mixed samples designated by 2.4/8 and 3.1/8 exhibit visible structures or stripes which result from the presence of individual (unmixed) portions of the components in the sample. The mixed samples designated by 2.4/12 and 3.1/12 however exhibit a generally uniform color shading which results from the absence of any visible portions of the components in the sample. The same applies for the mixed samples designated by 2.4/16 and 3.1/16.

Further there is a clear inhomogeneity in the mixed sample designated by 1.5/4 whereas the remaining mixed samples (1.5/5, 1.5/6, 1.5/7, 1.5/8, 1.5/9) are more homogeneous. In particular the mixed samples 1.5/7 to 1.5/9 are within the range R of the diagram shown in FIG. 3, although much higher number of mixing elements would be expected according to the diagram.

Figure 5:
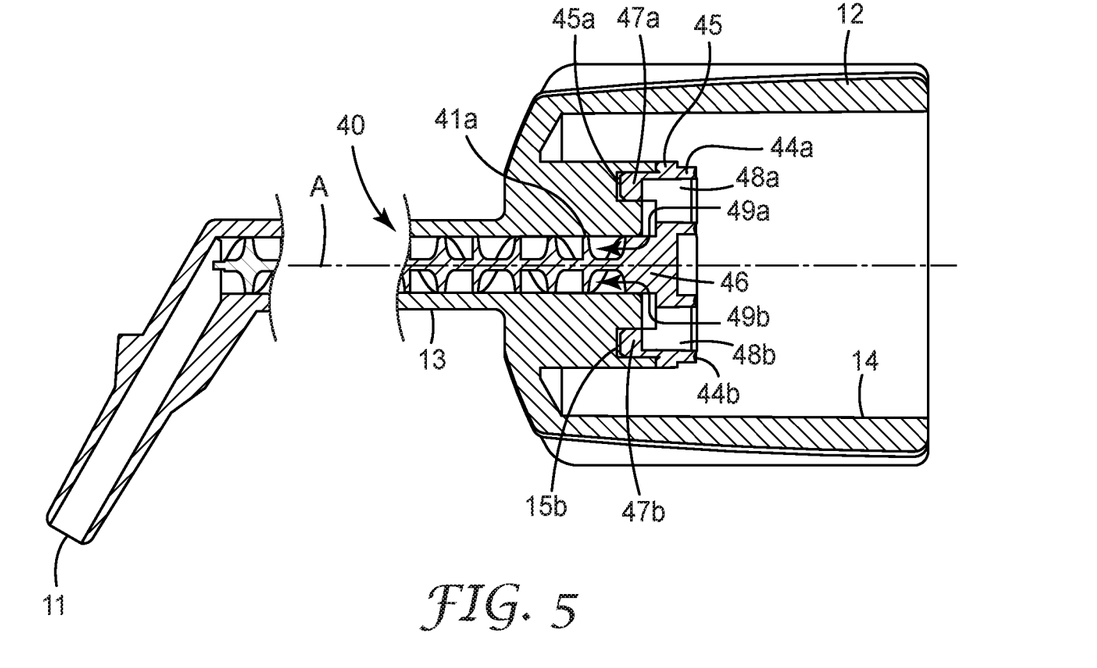
FIG. 5 is a cross-sectional view of a portion of the system as shown in FIG. 1.
Figure 6:
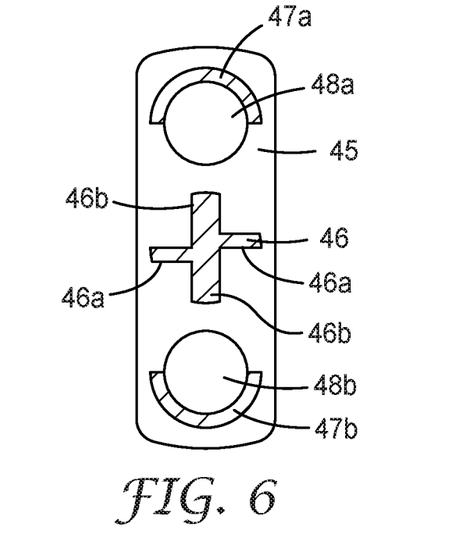
FIG. 6 is a partial top view on a portion of the mixing unit present in FIG. 5.

FIG. 5 shows a cross-section of the dispensing nozzle 10. The dispensing nozzle 10 comprises the mixing unit 40 arranged in a mixer housing 12. The mixing unit has a first inlet tube 44a and a second inlet tube 44 a. the first and second inlet tubes 44a, 44b form a rear end of the mixing unit 40. Adjacent the rear end of the mixing unit 40, further toward a front end the mixing unit 40 has a collector plate 45. The collector plate 45 extends in two directions laterally from the longitudinal axis A of the mixing unit 40. Further, the mixing unit has a substantially cross-shaped protrusion 46 (a cross-sectional top view is shown in FIG. 6) protruding forwards from the collector plate 45. As illustrated in FIG. 6 the protrusion 46 has cross bars 46*a* and dividers 46*b*. The cross bars 46 seal against the mixer housing and prevent merging of the two components prior to entering the rear most mixing element 41*a*. The dividers 46*b* divide the stream of each component into two separate partial streams. Upon entering the rear most mixing element 41*a* a first partial stream of a first of the two components merges with a first partial stream of the second of the two components, and a second partial stream of the first component merges with the second partial stream of the second component. Thus, the protrusion 46 provides for a premixing without merging the components in a flow area around the protrusion 46.

The mixer housing 12 comprises a mixing barrel 13 and forms the dispensing opening 11 and at a front end of the mixer housing 12. Further the mixer housing 12 forms at a rear end thereof a coupling 14 for attachment with the cartridge. In the example, the coupling is formed by the female part of a plug and socket connection. In another example the coupling may however be formed by the male part. The coupling preferably retains the mixer housing axially (in a dimension of the longitudinal axis A, but enables the mixer housing 12 to be rotatable relative to the cartridge. For the axial retention the coupling may have, for example an annular groove or rim which is engaged by a rim or groove of the cartridge, respectively. The skilled person will recognize various other retention structures for securing the mixer housing and the cartridge in a rotatable manner with each other.

The mixing unit 40 is retained at the mixer housing 12 against rotation about the longitudinal axis. Therefore the mixing unit 40 retention structures 47*a*, 47*b* which are mated with retention receptacles 15*a*, 15*b* of the mixer housing 12. In the example, the retention structures 47*a*, 47*b* are each formed by a non-circumferential wall (shown in cross-section in FIG. 6) protruding forwards from the collector plate 45. Each non-circumferential wall partially surrounds an opening of first and second through-channels 48*a*/48*b*. As shown, an inner surface of the first and second retention structure 47*a*, 47*b* forms a continuation of an inner surface of the first and second through-channel 48*a*, 48*b*, respectively. In the example further a portion of each of the first and second retention structure 47*a*, 47*b* overhangs the first and second through-channel 48*a*, 48*b*, respectively (not visible in FIG. 6).

The mixer housing 12 and the mixing unit 40 in combination form independent first and second inlet channels 49*a*, 49*b* extending between the first and second inlet tube 44*a*, 44*b*, respectively, and the end of the substantially cross-shaped protrusion 46.

As shown in FIG. 6 the two cross-bars 46*a* are arranged on opposite sides of the dividers 46*b*. The dividers 46*b* in combination protrude from the collector plate 45 at a generally rectangular structure. In this regard and for the purpose of the present specification the generally rectangular cross-section encompasses an outer contour which is formed of two parallel straight lines of the same lengths, whose spacing is smaller than their lengths, and two opposing circle segments each connecting adjacent ends of the straight lines (see FIG. 6). The two cross-bars 46*a* however are preferably arranged in an off-center relationship with respect to a center of the generally rectangular shape of the dividing bars. In particular, the cross-bars 46*a* are parallel offset relative to each other. With this arrangement the flow of the respective two divided streams of the individual components into the first mixing element is synchronized. This is because the mixing element (due to its helical shape) restricts the overall flow channel of one divided stream of the component and enhances the flow channel of the corresponding other divided stream, and the offset of the cross-bars compensates for the restriction/enhancement.

The invention claimed is:

1. A system comprising:
a static mixer comprising a mixing barrel extending along a longitudinal axis and, accommodated therein, a cascade of helical mixing elements, the mixing elements having an outer diameter D of between 1.5 mm and 1.6 mm, and the barrel having an inner diameter corresponding to the outer diameter of the mixing elements, wherein a helix of each of the helical mixing elements extends over a length L and a winding angle of 180 degrees, wherein the aspect ratio of L/D is between 0.6 and 1.2, and wherein the number of mixing elements is between 8 and 10; and
a dental material, wherein the dental material comprises at least two components, each of the at least two components having a viscosity between 2 Pascal seconds and 50 Pascal seconds.

2. The system of claim 1, wherein the cascade of mixing elements comprises first elements having a left handed winding and second elements having a right handed winding, wherein the first and second elements are alternately arranged in sequence along the longitudinal axis.

3. The system of claim 1, wherein the mixing elements are connected to each other to form a mixing unit.

4. The system of claim 3, wherein the mixing elements are arranged in a spaced relationship with each other connected by a connecting pin which is smaller in diameter than the outer diameter D.

5. The system of claim 3, wherein the mixing unit has a front end and a rear end, and a first and a second inlet tube at the rear end.

6. The system of claim 5, wherein the mixing unit has a collector plate adjacent the rear end which extends in at least two directions laterally from the longitudinal axis, and a substantially cross-shaped protrusion protruding from the collector plate and connecting with the rear most mixing element of the cascade of mixing elements.

7. The system of claim 6, wherein the first and second inlet tube protrude rearwards from the collector plate and form extensions of a first and second through-channel, respectively, through the collector plate.

8. The system of claim 6, including a mixer housing which comprises the mixing barrel, the mixer housing forming at a front end a dispensing opening and at a rear end a coupling for attachment of the mixer housing with a cartridge, wherein the mixing unit is retained at the mixer housing against rotation about the longitudinal axis.

9. The system of claim 8, wherein the mixing unit has at least one retention structure and the mixing housing has at least one retention receptacle, and wherein the retention against rotation between the mixing unit and the mixer housing is formed by a mating of the retention structure and the retention receptacle.

10. The system of claim 9, having a first and second retention structure each formed by a non-circumferential wall protruding forwards from the collector plate partially around an opening of the first and second through-channel, respectively, wherein an inner surface of the first and second retention structure forms a continuation of an inner surface of the first and second through-channel, respectively, and wherein a portion of each of the first and second retention structure overhangs the first and second through-channel, respectively.

11. The system of claim 10, wherein the mixer housing and the mixing unit in combination form independent first and second inlet channels extending between the first and second inlet tube, respectively, and the substantially cross-shaped protrusion.

12. A dispensing device for dental materials, comprising the system of claim 1, wherein the device has a cartridge having two chambers for holding the dental material in the form of two separate components, the device further having a plunger for displacing the dental material toward the mixing elements.

13. The dispensing device of claim 12, comprising a system,
wherein the mixing elements are connected to each other to form a mixing unit,
wherein the mixing unit has a front end and a rear end, and a first and a second inlet tube at the rear end,
wherein the mixing unit has a collector plate adjacent the rear end which extends in at least two directions laterally from the longitudinal axis, and a substantially cross-shaped protrusion protruding from the collector plate and connecting with the rear most mixing element of the cascade of mixing elements,
including a mixer housing which comprises the mixing barrel, the mixer housing forming at a front end a dispensing opening and at a rear end a coupling for attachment of the mixer housing with a cartridge, wherein the mixing unit is retained at the mixer housing against rotation about the longitudinal axis,
wherein the mixer housing in combination with the mixing unit forms a rotation valve with the cartridge for selectively establishing or blocking a fluid communication between the chambers and the mixing barrel by rotation of the mixer housing and the cartridge relative to each other.

14. The system of claim 1, wherein the number of mixing elements is 9.

15. The system of claim 1, wherein each of the at least two components has a viscosity between 5 Pascal seconds and 50 Pascal seconds.

* * * * *

UNITED STATES PATENT AND TRADEMARK OFFICE
CERTIFICATE OF CORRECTION

PATENT NO. : 10,786,333 B2
APPLICATION NO. : 15/737009
DATED : September 29, 2020
INVENTOR(S) : Andreas Boehm It is certified that error appears in the above-identified patent and that said Letters Patent is hereby corrected as shown below:

On the Title Page

Item (*) Notice: please delete the following language: "Subject to any disclaimer, the term of this patent is extended or adjusted under 35 U.S.C. 154(b) by 0 days. This patent is subject to a terminal disclaimer."

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*